(12) United States Patent
Oprisch et al.

(10) Patent No.: US 11,731,063 B2
(45) Date of Patent: Aug. 22, 2023

(54) FUEL FILTER ELEMENT AND FILTER ASSEMBLY

(71) Applicant: MANN+HUMMEL GmbH, Ludwigsburg (DE)

(72) Inventors: Christine Oprisch, Oberriexingen (DE); Martin Weindorf, Kornwestheim (DE); Martin Veit, Gaertringen (DE); Felix Lippert, Dillingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 213 days.

(21) Appl. No.: 17/087,785

(22) Filed: Nov. 3, 2020

(65) Prior Publication Data

US 2021/0046406 A1    Feb. 18, 2021

Related U.S. Application Data

(63) Continuation of application No. PCT/EP2019/061267, filed on May 2, 2019.

(30) Foreign Application Priority Data

May 3, 2018 (DE) .................... 10 2018 003 551.5

(51) Int. Cl.
 *B01D 29/21* (2006.01)
 *B01D 35/30* (2006.01)
 *F02M 37/48* (2019.01)

(52) U.S. Cl.
 CPC ............. *B01D 29/21* (2013.01); *B01D 35/30* (2013.01); *B01D 2201/0415* (2013.01); *B01D 2201/305* (2013.01); *F02M 37/48* (2019.01)

(58) Field of Classification Search
 CPC .................. B01D 29/21; B01D 35/30; B01D 2201/0415; B01D 2201/305; B01D 2201/16; B01D 2201/162; B01D 35/153; B01D 29/23; F02M 37/48
 USPC ....... 210/232, 136, 248, 440–444, 455, 457, 210/437, 485, 117, 119, 121, 123
 See application file for complete search history.

(56) References Cited

U.S. PATENT DOCUMENTS

| 4,424,128 | A | * | 1/1984 | Shinaver ................ B01D 35/30 |
| | | | | 210/119 |
| 5,704,553 | A | | 1/1998 | Wieczorek et al. |
| 8,906,127 | B2 | | 12/2014 | Oelpke |
| 8,985,401 | B2 | | 3/2015 | Welp |
| 10,765,977 | B2 | | 9/2020 | Baumann et al. |
| 2012/0111426 | A1 | | 5/2012 | Trakas |
| 2015/0001144 | A1 | | 1/2015 | Thomas et al. |

(Continued)

FOREIGN PATENT DOCUMENTS

CN  205390117 U  7/2016
DE  102010043218 A1  5/2012

*Primary Examiner* — Madeline Gonzalez

(57) ABSTRACT

A fuel filter element has a screen fabric as a filter medium and a support tube supporting the screen fabric. A valve body guide for guiding a spherical valve body is provided. The valve body guide has a fluid channel and one or more support ribs for supporting the spherical valve body. The support ribs extend along a longitudinal direction of the fluid channel and project radially into the fluid channel. A filter assembly with such a fuel filter element is provided. The filter assembly has a ball valve with spherical valve body and a filter housing with a valve seat for the spherical valve body of the ball valve.

13 Claims, 6 Drawing Sheets

(56) References Cited

U.S. PATENT DOCUMENTS

2018/0028949 A1 2/2018 Baumann et al.
2018/0243670 A1 8/2018 Scholl et al.

* cited by examiner

FUEL FILTER ELEMENT AND FILTER ASSEMBLY

CROSS-REFERENCE TO RELATED APPLICATIONS

This application is a continuation application of international application No. PCT/EP2019/061267 having an international filing date of 2 May 2019 and designating the United States, the international application claiming a priority date of 3 May 2018 based on prior filed German patent application No. 10 2018 003 551.5, the entire contents of the aforesaid international application and the aforesaid German patent application being incorporated herein by reference.

BACKGROUND OF THE INVENTION

The present invention concerns a fuel filter element and a filter assembly with such a filter element.

A motor vehicle, for example, a truck, can comprise an internal combustion engine, for example, a diesel engine. Prior to supplying the diesel fuel to a low pressure pump of an injection system of such a diesel engine, the diesel fuel is filtered by means of a strainer. Upstream of the strainer, a check valve may be provided that prevents penetration of air into a fuel line that supplies the diesel fuel to the strainer.

SUMMARY OF THE INVENTION

It is therefore object of the invention to provide an improved fuel filter element.

Accordingly, a fuel filter element, in particular a strainer element for filtering diesel fuel, is proposed. The filter element comprises a screen fabric as a filter medium and a support tube which supports the screen fabric. Moreover, it comprises a valve body guide for guiding a spherical valve body, wherein the valve body guide comprises a fluid channel and at least one support rib for the valve body that extends along a longitudinal direction of the fluid channel, and wherein the at least one support rib projects radially into the fluid channel.

The filter element is configured in particular to filter fuels, such as gasoline, diesel fuel or kerosene. Preferably, the filter element is a strainer for filtering diesel fuel of a vehicle. The filter element is in particular configured to separate contaminants, in particular particles and suspended solids, from diesel fuel. The filter element can be used in motor vehicles, watercraft, rail vehicles, agricultural vehicles, construction machines, aircraft or the like. Moreover, the filter element can also be used in immobile applications, for example in building technology. The filter element is in particular constructed substantially of rotational symmetry in respect to a center axis or symmetry axis. The longitudinal direction of the fluid channel is oriented in this context parallel to or along the symmetry axis. A radial direction of the fluid channel is oriented in this context perpendicularly to the longitudinal direction and away from the symmetry axis in the direction of an inner wall of the fluid channel. In particular, the at least one support rib projects in the radial direction into the fluid channel. Preferably, the at least one support rib projects only so far into the fluid channel that it does not extend across an entire diameter of the fluid channel. Thus, the at least one support rib preferably does not bridge the fluid channel completely. The at least one support rib projects preferably at least so far radially into the fluid channel that the valve body cannot be pushed through the fluid channel. The fluid channel can have a circular cross section. The fluid channel can however also have any other arbitrary cross section.

The filter element comprises preferably a filter medium in the form of a small-mesh net, in particular a plastic net or screen. In embodiments, the small-mesh net or screen fabric can also be comprised of other materials, for example, metals or metal alloys. For example, the filter medium can have a mesh size of 300 µm. Moreover, the filter element comprises a support tube which supports the filter medium. The support tube can support the filter medium from the exterior or from the interior. For example, the support tube is injection-molded by a plastics injection molding method onto the filter medium. The valve body guide is preferably connected to form one piece together with the support tube by means of a connecting section.

Since the support rib projects into the fluid channel, a faulty mounting of the valve body can be prevented because the latter cannot be pushed through the fluid channel. Since the valve body can rest against the at least one support rib, on the one hand, a defined position of the valve body is ensured and, on the other hand, a flow cross section of the fluid channel is reduced only minimally. This has the result that a flow rate of a raw fluid to be filtered is only insignificantly increased when flowing about the valve body. Both aforementioned effects prevent reliably a rotation of the valve body and thus an undesirable wear of the valve body.

In embodiments, the valve body guide is detachably connected to the filter element. Herein, "detachably" is to be understood in that the valve body guide can be separated from the filter element without causing destruction. For example, the valve body guide is screwed on, clipped on, or snapped on the filter element. Alternatively, the valve body guide can also be connected to the filter element so as to be inseparable. In this case, the valve body guide is embodied, for example, to form one piece together with the aforementioned support tube.

In embodiments, the at least one support rib comprises a curved support surface, in particular spherically curved or curved with a circular cylinder shape. This means that a geometry of the support surface is matched to an outer contour of the valve body. In this way, a good seat of the valve body on the at least one support rib is provided. In this way, a rotation of the valve body is reliably prevented.

In embodiments, the valve body guide comprises at least two support ribs. Preferably, more than two support ribs are provided. For example, three support ribs are provided which are arranged uniformly distributed about a circumference of the fluid channel. For example, the three support ribs are positioned relative to each other at a circumferential angle of 120°. In case that the valve body guide comprises two support ribs, the latter are positioned at a circumferential angle of 180° relative to each other. The valve body guide however can also comprise only one support rib or more than three support ribs.

In embodiments, the valve body guide and the at least one support rib project into an interior of the filter element. The interior of the filter element is preferably delimited by the filter medium. Preferably, the valve body guide comprises a riser pipe that projects into the interior. The at least one support rib extends within the riser pipe into the interior.

In embodiments, the valve body guide comprises a coupling pipe through which the fluid channel extends and at least one guide section which is projecting at the end face out of the coupling pipe, wherein the at least one support rib at least in sections thereof extends along the at least one guide section. This means that at least one support rib extends preferably past an end face of the coupling pipe. The valve body guide comprises moreover preferably the aforementioned riser pipe. The riser pipe and the coupling pipe are preferably embodied to form one piece together, in particular monolithically, wherein the fluid channel extends through the coupling pipe as well as through the riser pipe. Preferably, a plurality of such guide sections are provided. For example, three guide sections are provided wherein each guide section has correlated therewith a support rib. For example, three guide sections are provided which are arranged uniformly distributed about a circumference of the valve body guide. Between the guide sections, intermediate spaces are provided through with the raw fluid can flow around the valve body into the fluid channel. The coupling pipe is suitable to be received in a receiving region of a filter housing. In this way, the filter element can be coupled to the filter housing. The coupling pipe comprises preferably circumferentially extending annular grooves in which sealing elements, in particular O-rings, can be received. By means of the sealing elements, the coupling pipe can be sealed relative to the receiving region of the filter housing.

According to a preferred embodiment, the guide section can extend in circumferential direction and can have a significantly larger circumferential extension than the support rib. In particular, the circumferential extension of the guide section can be at least twice as large as the circumferential extension of the support rib, preferably at least three times as large. In this way, by the guide section a particularly effective "catching" of the valve body is enabled, even before the latter comes into contact with the support rib.

Moreover, the guide section can surround the support rib on a radially outer circumference; this improves the afore described catching function even further. In embodiments, the at least one guide section is of a trapezoidal shape. The at least one guide section can however also comprise a rectangular shape or any other arbitrary geometry.

In embodiments, a diameter of the fluid channel is larger than a diameter of the valve body. Alternatively, the diameter of the fluid channel and the diameter of the valve body can also be of the same size or the diameter of the valve body is smaller than the diameter of the fluid channel. In particular, the diameter of the valve body is however so large that it contacts the at least one support rib and thus cannot be introduced into the fluid channel.

Moreover, a filter assembly, in particular a strainer assembly for filtering diesel fuel, is proposed. Accordingly, the filter assembly is in particular embodied as a fuel filter assembly. The filter assembly comprises a filter element as described above, a filter housing, and a ball valve that comprises the spherical valve body, wherein the filter housing comprises a valve seat for the valve body, wherein the valve body in a closed state of the ball valve is contacting the valve seat, and wherein the valve body in an open state of the ball valve is contacting the at least one support rib.

The ball valve comprises moreover in particular the curved support surface of the at least one support rib. The ball valve is in particular a check valve. The ball valve can be brought from the closed state into the open state by means of the raw fluid which is flowing against the valve body. The valve body is made, for example, of a plastic material. Preferably, the plastic material has a reduced density compared to the raw fluid so that the valve body does not rise up in the raw fluid but sinks therein. Thus, when no raw fluid flows against the valve body anymore, the ball valve is automatically moved from the open state into the closed state. The filter housing comprises preferably a filter housing pot in which the filter element can be received as well as the aforementioned receiving region in which the coupling pipe of the filter element can be received. The filter housing comprises moreover a filter housing cover that is detachably connected to the filter housing pot. For example, the filter housing cover can be screwed onto the filter housing pot. The filter housing cover can be coupled by means of a bayonet closure to the filter element.

In embodiments, the valve seat is curved, in particular spherically curved. This means that a geometry of the valve seat is matched to an outer contour of the valve body. In this way, a particularly good sealing action of the valve body relative to the valve seat is provided. The valve seat can alternatively also be of a truncated cone shape.

BRIEF DESCRIPTION OF THE DRAWINGS

In the Figures, same or functionally the same elements, inasmuch as nothing else is mentioned, are provided with the same reference characters.

DESCRIPTION OF PREFERRED EMBODIMENTS

Figure 1:
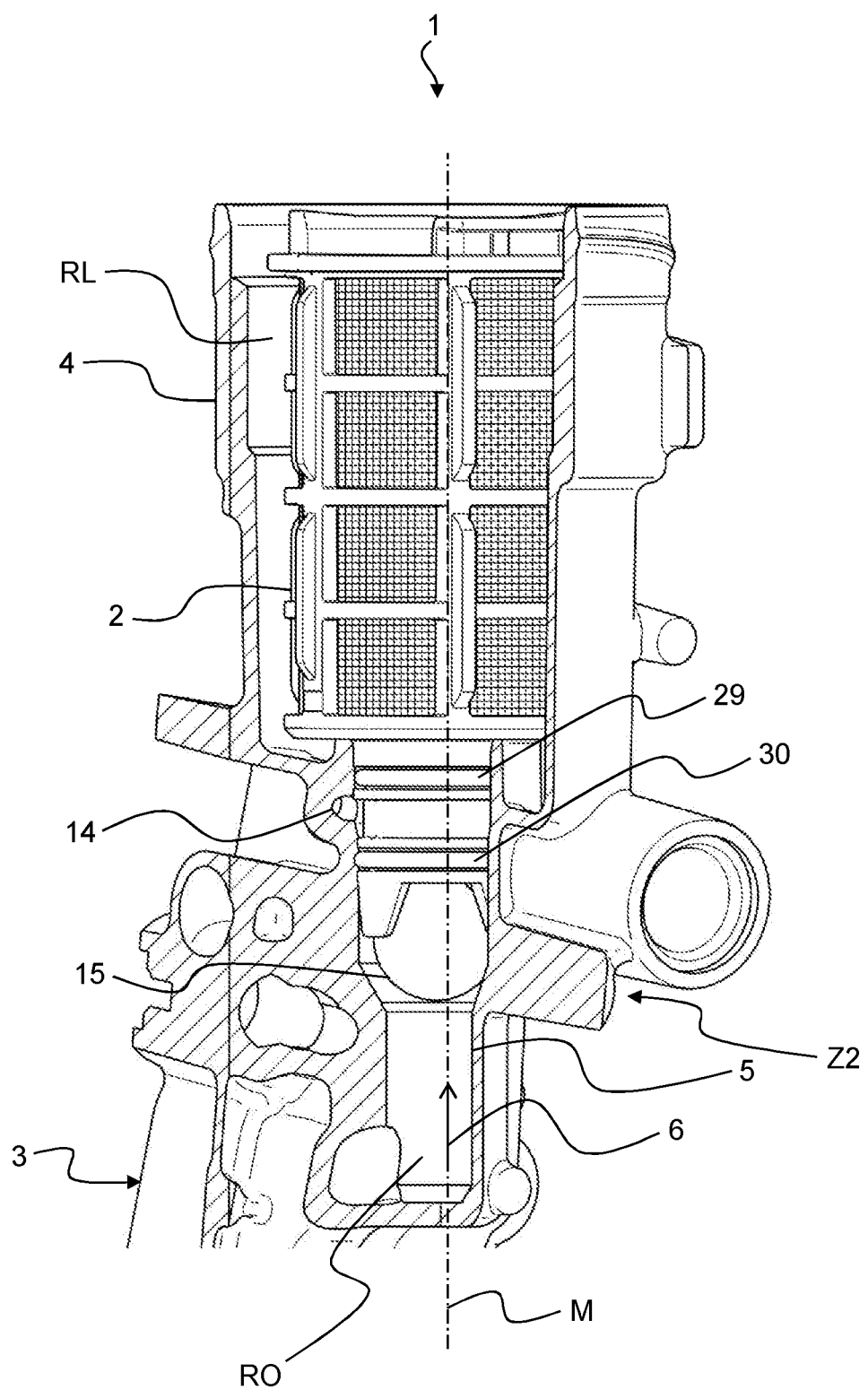
FIG. 1 shows a schematic partial section view of an embodiment of a filter assembly.
Figure 2:
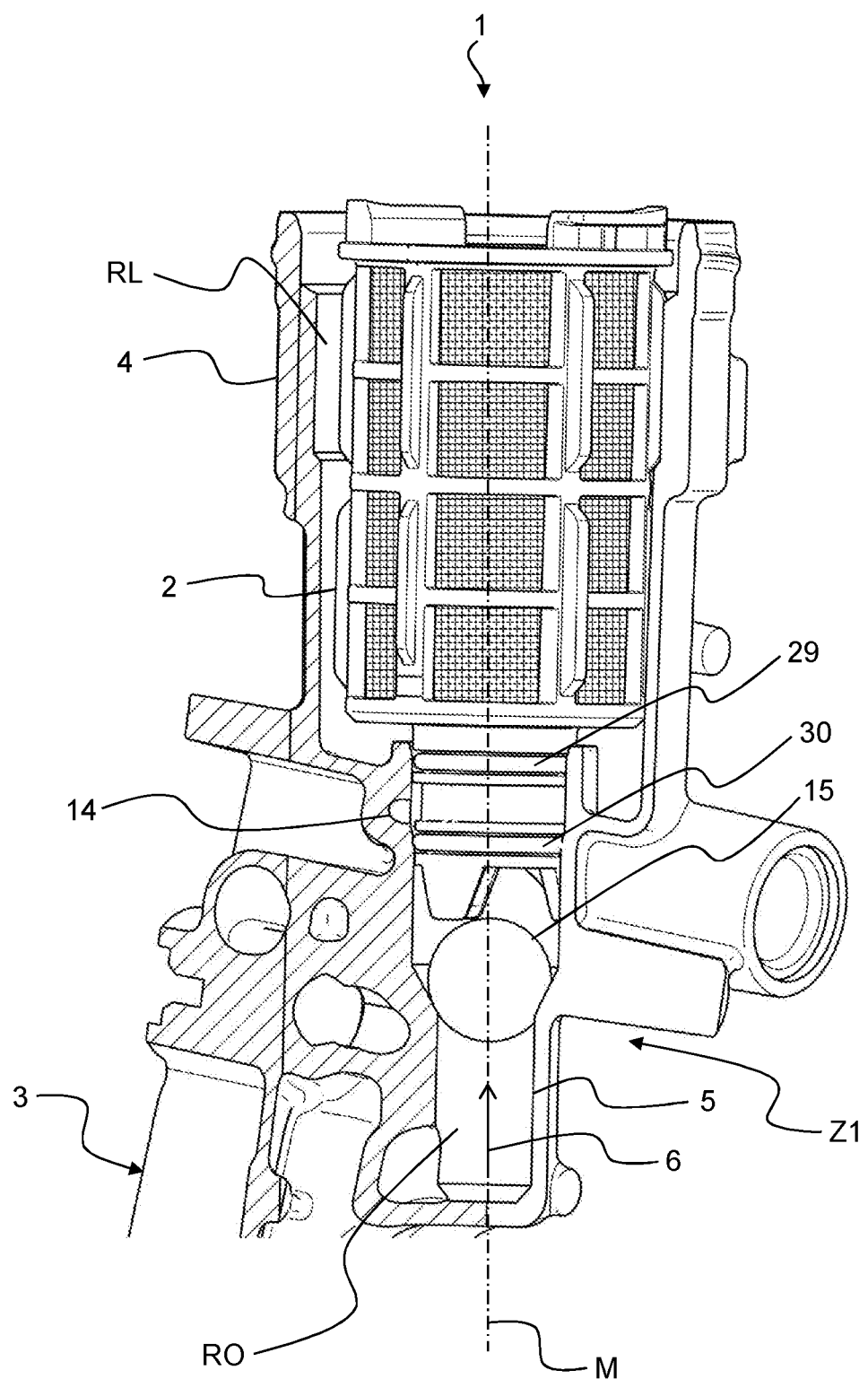
FIG. 2 shows a further schematic partial section view of the filter assembly according to FIG. 1.
Figure 3:
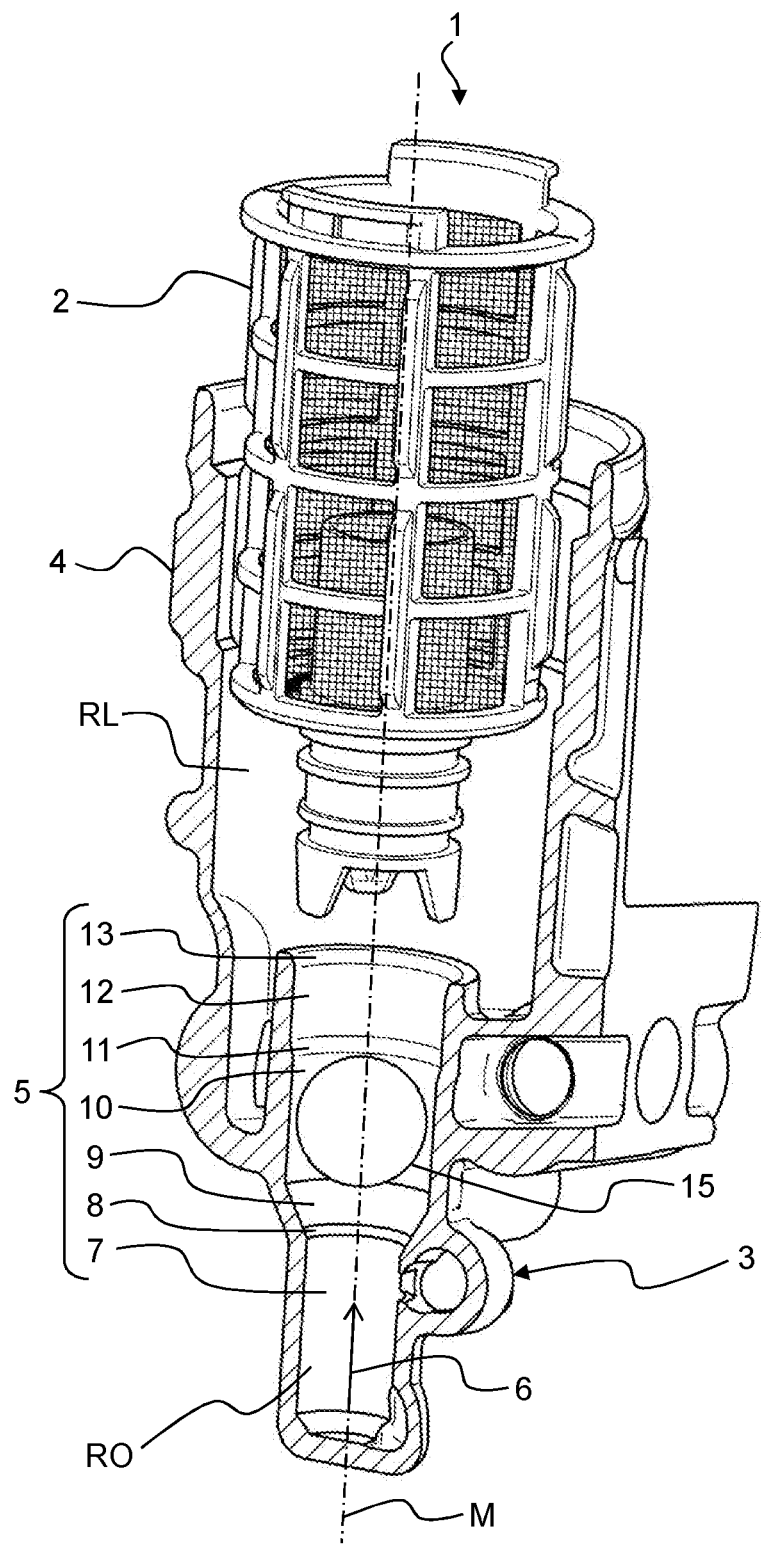
FIG. 3 shows a further schematic partial section view of the filter assembly according to FIG. 1.

FIGS. 1 to 3 show respectively a schematic partial section view of an embodiment of a filter assembly 1. The filter assembly 1 can be suitable to filter liquid operating media of a vehicle, for example, fuels, such as diesel fuel, kerosene or gasoline. Preferably, the filter assembly 1 is used in motor vehicles, in particular in passenger cars, trucks, construction vehicles or agricultural machines, in watercraft, in rail vehicles or in aircraft. Moreover, the filter assembly 1 can be used, for example, in building technology. Preferably, the filter assembly 1 is a strainer assembly which is suitable to filter diesel fuel.

The filter assembly 1 comprises a filter element 2. The filter element 2 is preferably a strainer element for filtering diesel fuel of an internal combustion engine, in particular of a diesel engine. The filter element 2 will be discussed in the following with reference to FIGS. 4 to 6. The filter element 2 is received in a filter housing 3. The filter housing 3 comprises a filter housing pot 4 in which the filter element 2 is arranged. The filter housing 3 can be part of a motor housing of the aforementioned internal combustion engine.

The filter housing pot 4 is preferably constructed substantially with rotational symmetry relative to a central axis or symmetry axis M. The filter housing pot 4 in the orientation of FIGS. 1 to 3 is open in an upward direction and can be fluid-tightly closed off by means of a filter housing cover, not illustrated. The filter housing cover can be connected detachably to the filter housing pot 4, for example, by means of a thread or a bayonet closure. The filter housing pot 4 comprises an outlet or drain, not illustrated, by means of which clean fluid purified by means of the filter element 2, for example, filtered diesel fuel, can be discharged and, for example, supplied to a low pressure pump of a diesel injection system of the internal combustion engine.

The filter housing 3 comprises a receiving region 5 which is constructed as a stepped bore in the filter housing 3. Raw fluid to be filtered, in particular diesel fuel to be filtered, is supplied to the receiving region 5 by means of an inlet or supply, not illustrated. A main flow path 6 of the raw fluid is oriented parallel to the symmetry axis M.

As illustrated in FIG. 3, the receiving region 5 comprises, viewed in the direction of the main flow path 6, a cylinder-shaped first section 7; a valve seat 8 adjoining the first section 7 and curved spherically or curved in a ball shape; a truncated cone-shaped second section 9 adjoining the valve seat 8; a cylinder-shaped third section 10 adjoining the second section 9; a truncated cone-shaped fourth section 11 adjoining the third section 10; a cylinder-shaped fifth section 12 adjoining the fourth section 11; as well as a truncated cone-shaped sixth section 13 adjoining the fifth section 12. The sections 10 to 13 can extend in this context in a tubular shape into the filter housing pot 4. A diameter of the sections 7 to 13 increases, viewed along the main flow path 6, beginning at the first section 7 toward the sixth section 13. At the third section 10, moreover a drain channel 14 (FIGS. 1 and 2) is provided.

In this context, that the valve seat 8 is "spherically" curved or curved in a ball shape, means that the valve seat 8 has the shape of a sphere segment that is cut out of a sphere by two parallel planes. This sphere segment is delimited by a transition of the first section 7 into the valve seat 8 and by a transition of the valve seat 8 into the second section 9.

In the receiving region 5, a spherical valve body 15 is received. The valve body 15 can also be referred to as valve ball. The valve body 15 is matched to the valve seat 8 such that the valve body 15 rests areally on the valve seat 8 and can seal fluid-tightly relative thereto. The valve body 15 is manufactured, for example, of a plastic material. Preferably, the plastic material has a reduced density compared to the raw fluid so that the valve body 15 will not rise in the raw fluid. Preferably, the valve body 15 is manufactured of polyamide (PA), in particular of polyamide 6 (PA 6). The valve body 15 can however be manufactured also of any other suitable material. The valve body 15 is in particular movable linearly within the sections 9, 10 along the symmetry axis M, meaning in the direction of the main flow path 6 or opposite thereto.

Figure 4:
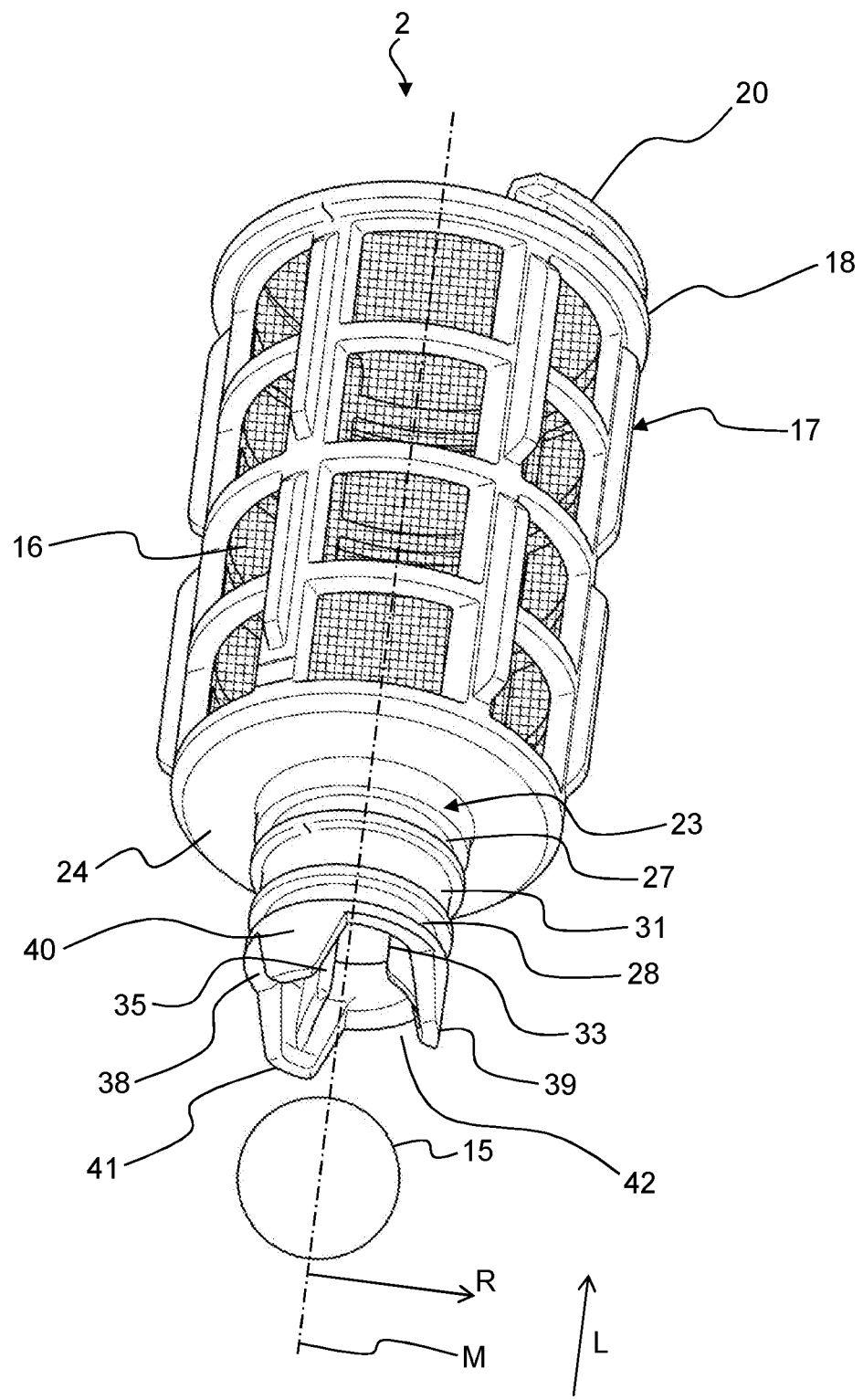
FIG. 4 shows a schematic perspective view of an embodiment of a filter element for the filter assembly according to FIG. 1.
Figure 5:
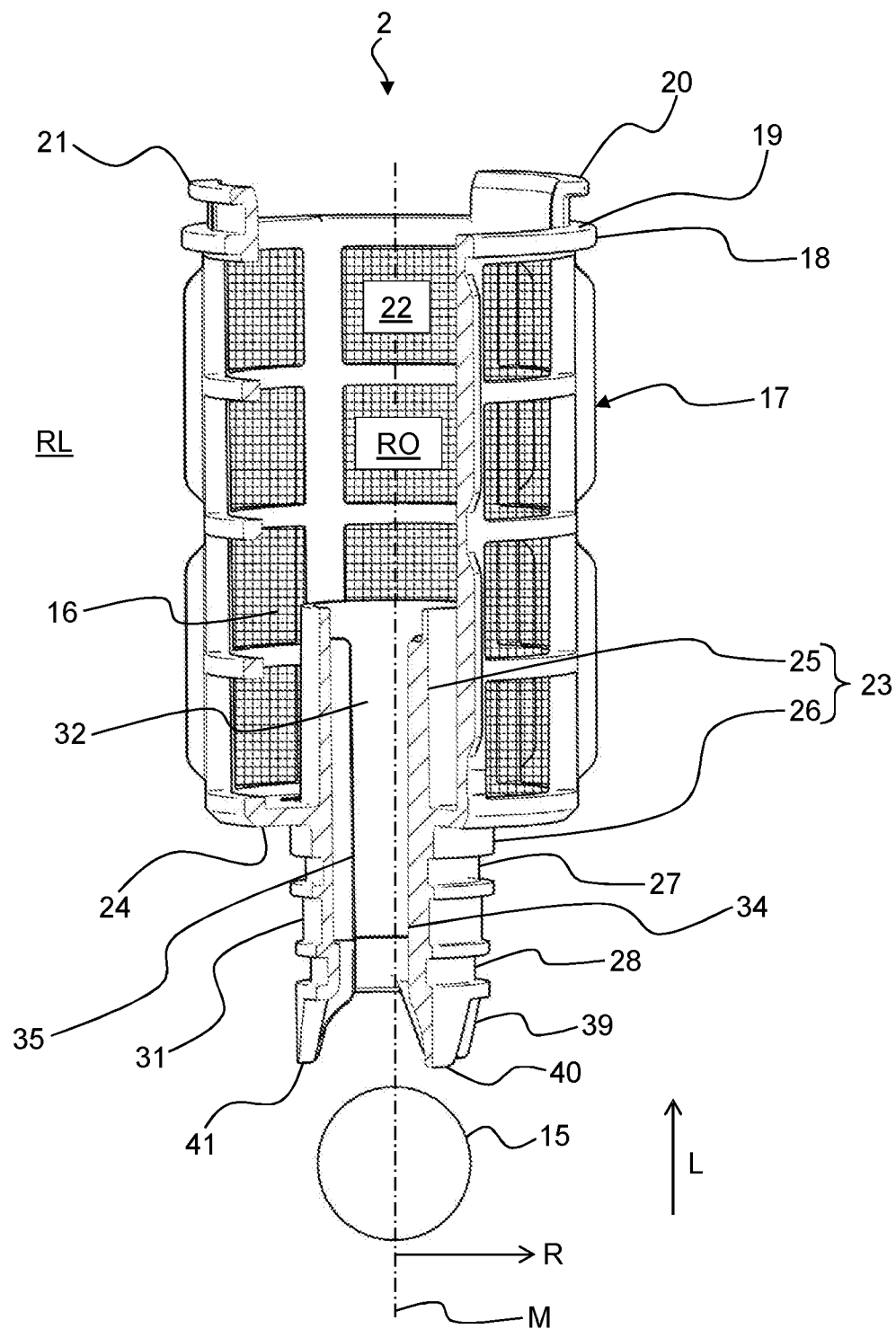
FIG. 5 shows a schematic section view of the filter element according to FIG. 4.
Figure 6:
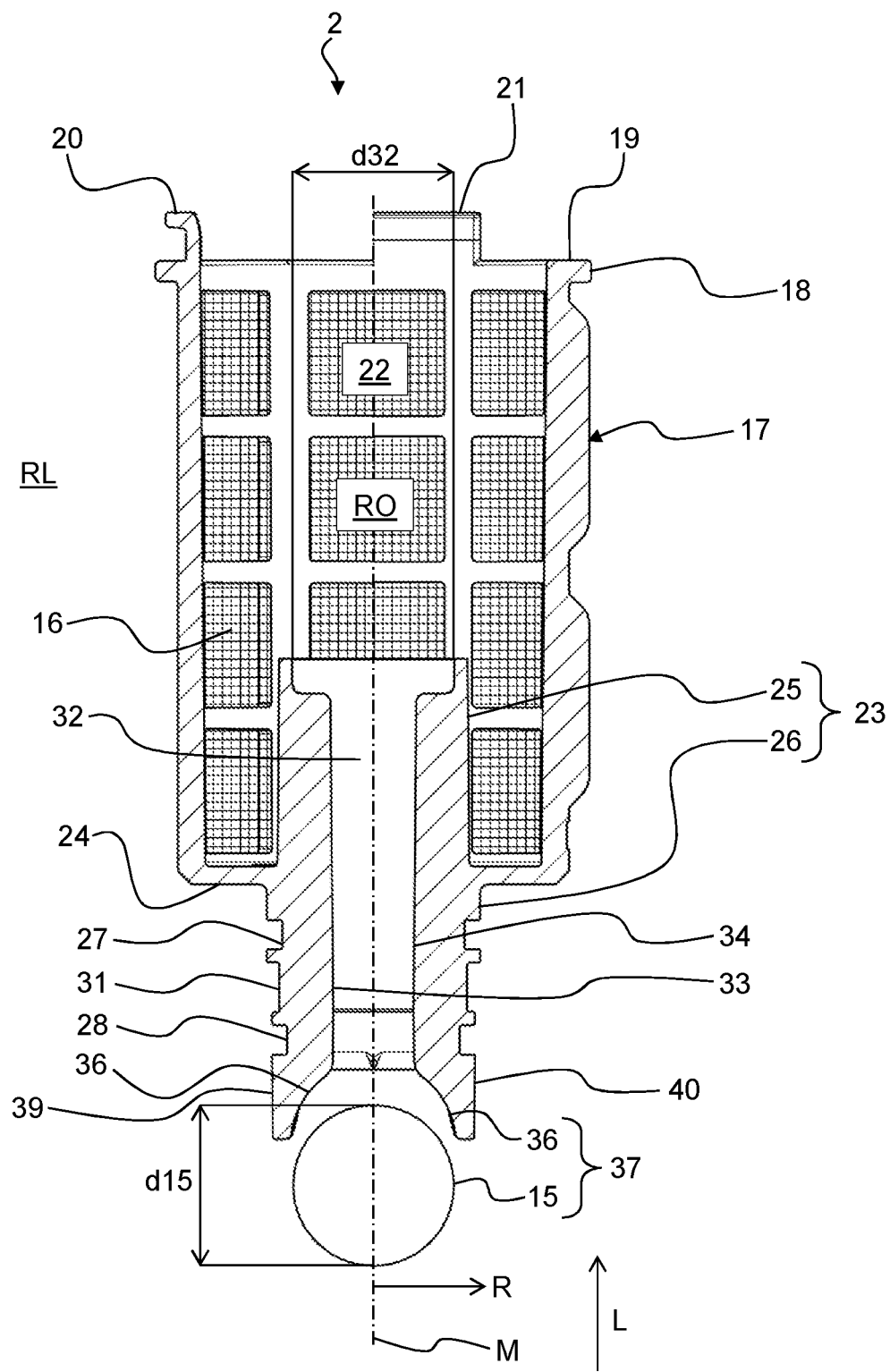
FIG. 6 shows a further schematic section view of the filter element according to FIG. 4.

Now returning to the filter element 2 shown in FIGS. 4 to 6. The filter medium 16 is constructed preferably of rotational symmetry relative to the aforementioned symmetry axis M. The filter element 2 comprises a filter medium 16. The filter medium 16 can be, for example, a plastic net with a mesh size of 500 μm to 200 μm, in particular of 300 μm. The filter medium 16 forms a cylinder surface which is constructed of rotational symmetry relative to the symmetry axis M.

The filter medium 16 however can also be or comprise, for example, a filter fabric, a laid filter material or a filter nonwoven. The filter medium 16 can be felted or needled. The filter medium 16 can comprise natural fibers such as cellulose or cotton, or plastic fibers, for example, of polyester, polyvinyl sulfide or polytetrafluoroethylene. Fibers of the filter medium 16 can be oriented during manufacture in a machine direction, slanted to the machine direction and/or transverse to the machine direction. The filter medium 16 can also be a filter body of flat and zigzag-folded filter material. In this case, the zigzag-shaped filter material forms the filter medium 16 as a star-shaped endless folded bellows which substantially forms a cylinder surface.

The filter medium 16 is supported from the exterior by a fluid-permeable support tube 17. The support tube 17 can be embodied tubular. The support tube 17 can also be designed as a support structure or can be referred to as such. Preferably, the support tube 17 is grid-shaped. The support tube 17 can prevent collapse of the filter medium 16. The support tube 17 can also be arranged inside the filter medium 16. For example, the support tube 17 is injection-molded by a plastics injection molding method onto the filter medium 16. The support tube 17 comprises a ring section 18 that extends circumferentially in an annular shape about the symmetry axis M. By means of the ring section 18, a fluid-tight sealing action of the filter element 2 with respect to the filter housing 3 can be achieved.

From an end face 19 of the ring section 18, two follower elements 20, 21 are protruding. Preferably, the follower elements 20, 21 are integrally formed as one piece, in particular monolithically, together with the ring section 18. Here, "one piece" means that the ring section 18 and the follower elements 20, 21 form together a common component. In this context, "monolithic" means that the ring section 18 and the follower elements 20, 21 are manufactured throughout of the same material or substance.

The follower elements 20, 21 can be part of a bayonet closure with which the filter element 2 can be connected with form fit to the aforementioned filter housing cover. For this purpose, at the filter housing cover corresponding follower counter elements are provided. A form fit connection is produced by the mutual engagement and engagement from behind of at least two connection partners, in this case of the follower elements 20, 21 and the corresponding follower counter elements. Since the filter element 2 is coupled with the filter housing cover, the filter element 2 can be pulled out of the filter housing pot 4 when removing the filter housing cover from the filter housing pot 4.

The filter medium 16 or the support tube 17 delimits an interior 22 of the filter element 2. The interior 22 is cylinder-shaped and constructed of rotational symmetry to the symmetry axis M. The filter element 2 comprises moreover a valve body guide 23 for guiding the valve body 15. The valve body guide 23 and the support tube 17 can be connected as one piece, in particular monolithically, by means of a disk-shaped connecting section 24. This means that the valve body guide 23 can be part of the support tube 17.

Alternatively (not shown), the valve body guide 23 can also be detachably connected to the filter element 2, in particular detachably to the support tube 17. In this case, the valve body guide 23 can be snapped on, clipped on, screwed onto the filter element 2 or connected in other ways in a form-fit and/or material-fused connection with the filter element 2. Moreover, the valve body guide 23 can also be part of the filter housing 3 and, for example, detachably coupled thereto.

The valve body guide 23 is tubular and is substantially constructed of rotational symmetry relative to the symmetry axis M. The valve body guide 23 comprises a riser pipe 25 extending into the interior 22 of the filter element 2 as well as a coupling pipe 26 that is formed as one piece, in particular monolithically, together with the riser pipe 25 and projects at the end face out of the connecting section 24 and that can be received in the receiving region 5 of the filter housing 3. The riser pipe 25 and the coupling pipe 26 are constructed in this context with rotational symmetry relative to the symmetry axis M.

At the exterior side at the coupling pipe 26, two circumferentially extending annular grooves 27, 28 are provided in which two sealing elements 29, 30 (FIGS. 1 and 2), in particular O-rings, can be received. By means of the sealing elements 29, 30, the coupling pipe 26 is sealed relative to the receiving region 5. Between the annular grooves 27, 28, an annular drain groove 31 is provided extending circumferentially about the coupling pipe 26 which, in a mounted state of the filter element 2 in the filter housing 3, is in fluid communication with the drain channel 14 of the filter housing 3 (FIG. 1).

The valve body guide 23 comprises moreover a fluid channel 32 extending through the entire valve body guide 23, i.e., through the riser pipe 25 as well as through the coupling pipe 26. The fluid channel 32 can have a circular cross section. Alternatively, the fluid channel 32 can also have any other arbitrary cross section. The fluid channel 32 has a diameter d32 (FIG. 6).

The fluid channel 32 comprises a longitudinal direction L. The longitudinal direction L is oriented parallel to the symmetry axis M or coincides therewith. In the orientation of FIG. 4, the longitudinal direction L is oriented from bottom to top. The longitudinal direction L can however also be oriented from top to bottom. Moreover, the fluid channel 32 has also correlated therewith a radial direction R. In this context, the radial direction R is oriented perpendicularly to the longitudinal direction L, respectively, perpendicularly to the symmetry axis M. In this context, the radial direction R is oriented away from the symmetry axis M in the direction of an inner wall of the fluid channel 32.

The valve body guide 23 comprises a plurality of support ribs 33 to 35 which extend along the longitudinal direction L. Preferably, three such support ribs 33 to 35 are provided. In particular, at least two such support ribs 33 to 35 are provided. The valve body 15 can rest on the support ribs 33 to 35. The support ribs 33 to 35 project in the radial direction R into the fluid channel 32. The support ribs 33 to 35 do not extend however across the entire diameter d32 of the fluid channel 32.

Preferably, the support ribs 33 to 35 are uniformly distributed about a circumference of the fluid channel 32. Each support rib 33 to 35 has correlated therewith a curved support surface 36 (FIG. 6) for the valve body 15. The support surface 36 in this context is preferably curved spherically or curved with a circular cylinder shape. This means that the respective support surface 36 is matched to an outer contour of the valve body 15. In this way, a geometry or curvature of the support surface 36 is matched to a diameter d15 of the valve body 15. The support surfaces 36 of the support ribs 33 to 35, the valve body 15, and the valve seat 8 form a ball valve 37 (FIG. 6), in particular a check valve, of the filter assembly 1.

The coupling pipe 26 or the valve body guide 23 comprises an end face 38 (FIG. 4) oriented in the direction toward the valve body 15 and from which trapezoidal guide sections 39 to 41 protrude. The guide sections 39 to 41 are arranged in this context uniformly distributed about a circumference of the valve body guide 23. In this context, each support rib 33 to 35 has correlated therewith such a guide section 39 to 41. The support ribs 33 to 35 extend in this context at least in sections thereof along the guide section 39 to 41 correlated with the respective support rib 33 to 35. The support ribs 33 to 35 extend thus past the end face 38. Between the guide sections 39 to 41, intermediate spaces 42 (FIG. 4) are provided through which the raw fluid can flow.

The filter element 2 comprises a raw side RO as well as a clean side RL. The raw side RO is correlated with the interior 22. The clean side RL is outside of the filter medium 16, i.e., arranged in an annular space provided between the filter medium 16 and the filter housing pot 4. In operation of the filter assembly 1, the raw fluid flows from the raw side RO through the filter medium 16 to the clean side RL whereby contaminants are retained by the filter medium 16 and remain in the interior 22.

The ball valve 37 can be moved by means of the raw fluid flowing in the direction of the main flow path 6 from a closed state Z1 (FIG. 2), in which the valve body 15 is resting seal-tightly on the valve seat 8, into an open state Z2 (FIG. 1), in which the valve body 15 is lifted off the valve seat 8 and is resting on the support surfaces 36 of the support ribs 33 to 35. As soon as no raw fluid flows along the main flow path 6 anymore, the valve body 15 sinks and seals again fluid-tightly relative to the valve seat 8. In this way, it can be reliably prevented that air reaches a fuel line which is connected to the receiving region 5. In this way, it is prevented that the low pressure pump positioned downstream of the valve assembly 1 will suck in air after an exchange of the filter element 2.

Since the support ribs 33 to 35 are provided, a defined position of the valve body 15 is ensured in the open state Z2 of the ball valve 37. A flow cross section extending about the valve body 15 for the raw fluid is only insignificantly restricted by the support ribs 33 to 35. An undesirable rotation and thus wear of the valve body 15 can be prevented in a reliable manner by the defined position thereof and by preventing an increase of the flow rate of the raw fluid due to only a minimal restriction of the aforementioned flow cross section.

Moreover, a faulty assembly of the valve body 15 is prevented. The valve body 15, even when its diameter d15 is smaller than the diameter d32 of the fluid channel 32, cannot be inserted in the orientation of FIGS. 4 to 6 from above into the valve body guide 23. This is so because the support ribs 33 to 35 project so far into the fluid channel 32 that the valve body 15 is resting thereon. The support ribs 33 to 35 prevent thus reliably faulty installation of the valve body 15. In particular, a so-called error-avoiding poka-yoke principle can be realized in this way.

For exchange of the filter element 2, the latter is pulled out of the filter housing pot 4, as illustrated in FIG. 2 (partially pulled out) and FIG. 3. In this context, clean fluid contained in the filter housing pot 4 can drain through the drain channel 14. The riser pipe 25 prevents in this context that contaminants collected in the interior 22 can reach the receiving region 5.

LIST OF REFERENCE CHARACTERS 1 filter assembly
2 filter element
3 filter housing
4 filter housing pot
5 receiving region
6 main flow path
7 section
8 valve seat
9 section
10 section
11 section
12 section
13 section
14 drain channel
15 valve body
16 filter medium/screen fabric 17 support tube
18 annular section
19 end face
20 follower element
21 follower element
22 interior
23 valve body guide
24 connecting section
25 riser pipe
26 coupling pipe
27 annular groove
28 annular groove
29 sealing element
30 sealing element
31 drain groove
32 fluid channel
33 support rib
34 support rib
35 support rib
36 support surface
37 ball valve
38 end face
39 guide section
40 guide section
41 guide section
42 intermediate space
d15 diameter
d32 diameter
L longitudinal direction
M symmetry axis
R radial direction
RL clean side
RO raw side
Z1 closed state
Z2 open state

What is claimed is:

1. An exchangeable fuel filter element configured for exchangeable installation into a filter housing pot having a valve seat, the fuel filter element comprising:
    a support tube which is axially elongated and surrounding a longitudinal axis (M);
    a screen fabric arranged on the support tube as a filter medium;
    a valve body guide comprising:
        a spherical valve body;
        a disk-shaped connecting section arranged on and covering a first axial end of the support tube;
        a tubular valve body guide arranged on and projecting axially outward from an axial outer side of the disk-shaped connecting section;
        wherein the tubular valve body guide having a fluid channel extending axially through the tubular valve body guide and opening into an interior of the filter element;
        a plurality of guide sections formed as projections, projecting axially outward away from an axially outer end of the tubular valve body guide, the plurality of guide sections spaced circumferentially apart about a circumference of the fluid channel;
        one or more support ribs formed on an interior wall of the tubular valve body guide and protruding radially into the fluid channel, the one or more support ribs extending in an interior of the fluid channel along a longitudinal direction (M) of the fluid channel;
    wherein the one or more radially projecting support ribs extend onto at least a portion of a radially inner surface of the plurality of guide sections;
    a spherical valve body movable in the valve body guide at an interior of the plurality of guide sections at the fluid channel, movable between a closed state and an open state;
    wherein the spherical valve body, when in the open state, is attached to the one or more radially projecting support ribs in the valve body guide,
    wherein in the closed state, the spherical valve body closes against the valve seat of the filter housing pot.

2. The fuel filter element according to claim 1, wherein the valve body guide is connected detachably to the filter element.

3. The fuel filter element according to claim 1, wherein the one or more support ribs comprise a curved support surface configured to support the spherical valve body.

4. The fuel filter element according to claim 3, wherein the curved support surface is spherically curved or curved in a circular cylinder shape.

5. The fuel filter element according to claim 1, wherein the valve body guide comprises at least two of the one more support ribs.

6. The fuel filter element according to claim 1, wherein the valve body guide and the one or more support ribs project into an interior of the filter element.

7. The fuel filter element according to claim 1, wherein the valve body guide comprises a coupling pipe,
wherein the fluid channel extends through the coupling pipe,
wherein the coupling pipe comprises an end face,
wherein the plurality of guide sections project from the end face away from the coupling pipe.

8. The fuel filter element according to claim 7, wherein the plurality of guide sections extend in a circumferential direction and comprises a circumferential extension that is significantly larger than a circumferential extension of the one or more support ribs.

9. The fuel filter element according to claim 8, wherein the circumferential extension of the plurality of guide sections is at least twice as large as the circumferential extension of the one or more support ribs.

10. The fuel filter element according to claim 8, wherein the circumferential extension of the plurality of guide sections is at least three times as large as the circumferential extension of the one or more support ribs.

11. The fuel filter element according to claim 8, wherein the plurality of guide sections surround the one or more support ribs on a radially outer circumference.

12. The fuel filter element according to claim 7, wherein the plurality of guide sections are of a trapezoidal shape.

13. The fuel filter element according to claim 1, wherein the fuel filter element is a strainer element.

* * * * *